(12) United States Patent
Pettersson et al.

(10) Patent No.: US 9,481,982 B1
(45) Date of Patent: Nov. 1, 2016

(54) METHOD AND CONTROL SYSTEM FOR SURVEYING AND MAPPING A TERRAIN WHILE OPERATING A BULLDOZER

(71) Applicant: HEXAGON TECHNOLOGY CENTER GMBH, Heerbrugg (CH)

(72) Inventors: Bo Pettersson, Luxembourg (LU); Benedikt Zebhauser, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/133,145

(22) Filed: Apr. 19, 2016

(30) Foreign Application Priority Data

Apr. 21, 2015 (EP) .................................... 15164557

(51) Int. Cl.
| | | |
|---|---|---|
| *E02F 3/84* | (2006.01) | |
| *G01S 15/00* | (2006.01) | |
| *E02F 9/26* | (2006.01) | |
| *G05D 1/02* | (2006.01) | |
| *G06T 17/05* | (2011.01) | |
| *H04N 7/18* | (2006.01) | |
| *G06K 9/00* | (2006.01) | |
| *G01C 11/08* | (2006.01) | |
| *G01S 17/08* | (2006.01) | |

(52) U.S. Cl.
CPC ............... *E02F 9/261* (2013.01); *E02F 3/841* (2013.01); *E02F 3/844* (2013.01); *E02F 9/262* (2013.01); *G01C 11/08* (2013.01); *G01S 17/08* (2013.01); *G05D 1/0278* (2013.01); *G06K 9/0063* (2013.01); *G06K 9/00805* (2013.01); *G06T 17/05* (2013.01); *H04N 7/181* (2013.01)

(58) Field of Classification Search
CPC ......... E02F 9/261; E02F 9/262; E02F 3/841; E02F 3/844; G05D 1/0276; G06T 17/05; H04N 7/181; G06K 9/0063; G06K 9/00805; G01C 11/08; G01S 17/08
USPC .......................................................... 701/50
See application file for complete search history.

(56) References Cited

U.S. PATENT DOCUMENTS

| | | |
|---|---|---|
| 5,646,844 A | 7/1997 | Gudat et al. |
| 5,925,085 A | 7/1999 | Kleimenhagen et al. |

(Continued)

FOREIGN PATENT DOCUMENTS

WO    2004/059900 A2    7/2004

OTHER PUBLICATIONS

Extended European Search Report dated Nov. 4, 2015 as received in Application No. 15164557.9.

*Primary Examiner* — Richard Camby
(74) *Attorney, Agent, or Firm* — Maschoff Brennan (57) ABSTRACT

A Method for generating scaled terrain information while operating a bulldozer. The bulldozer may include a driving unit comprising a set of drive wheels, a motor connected to at least one of the drive wheels, a blade for altering the surface of the terrain, at least one camera for capturing images of the environment, the camera being positioned and aligned in a known manner relative to the bulldozer, and a controlling and processing unit. A method may include moving the bulldozer while concurrently generating a set of image data by capturing an image series of terrain sections with the at least one camera so that at least two images of the image series cover an amount of identical points in the terrain, and either applying a simultaneous localization and mapping (SLAM) algorithm or a stereo photogrammetry algorithm to the set of image data and thereby deriving terrain data.

20 Claims, 3 Drawing Sheets

(56) References Cited

U.S. PATENT DOCUMENTS

| | | |
|---|---|---|
| 5,964,298 A | 10/1999 | Greenspun |
| 6,247,538 B1 | 6/2001 | Takeda et al. |
| 8,478,492 B2 | 7/2013 | Taylor et al. |
| 2011/0169949 A1 | 7/2011 | McCain et al. |
| 2016/0097183 A1* | 4/2016 | Kirsch ............... E02F 3/7663 701/50 |

* cited by examiner

METHOD AND CONTROL SYSTEM FOR SURVEYING AND MAPPING A TERRAIN WHILE OPERATING A BULLDOZER

FIELD

This invention relates to a method and a control system comprising at least one camera for generating terrain information with help of that bulldozer while moving.

BACKGROUND

Common geography-altering machines such as bulldozers typically comprise monitoring systems and sensors which provide several functionalities, with detecting and avoiding obstacles and localizing the machine in the terrain among them. Existing systems are mainly designed to provide terrain information to an operator of the vehicle, wherein the information are derived through monitoring of material transport and work cycles.

Earth-moving machines using a positioning system for determining positional information of the blade relative to the work site are known from U.S. Pat. No. 5,964,298 and U.S. Pat. No. 5,925,085. A designated and an actual surface contour of the work site being known, a display device visible to a driver of the earthmover shows the difference between the two surface contours on a map of the work site. The positional system allows for relating the contour difference data to the current position.

Additionally, a method is known from U.S. Pat. No. 5,646,844, which is providing position information from several machines being shared to generate a common, dynamically-updated site database showing the relative positions of the machines and the site progress in real time.

Moreover, control systems for construction vehicle are known from US 2011/0169949 and U.S. Pat. No. 8,478,492, which comprise cameras as an elementary component, the cameras observing an implement on the vehicle and determining its position and orientation.

Commonly shared by those systems is their use of a satellite positioning system to assign gathered data to a location record.

SUMMARY

Some embodiments of the present invention provide an improved work site monitoring system for bulldozers with use of a control system comprising at least one camera, wherein the bulldozer, particularly a blade of the bulldozer, is moved in a way that the terrain is shaped more efficiently and more accurately.

Moreover, some embodiments of the present invention provide an improved bulldozer which is capable to derive terrain information while applying a bulldozing process in order to provide precise orientation and localisation in the terrain.

Some embodiments of the present invention provide information about terrain conditions correlated with relative position information of respective terrain sections. Particularly, the terrain information is associated with absolute position information and/or provided to an operator of the bulldozer.

Some embodiments of the present invention provide respective navigation functionality for such a bulldozer in order to enable an automatic and controlled movement of the bulldozer.

Some embodiments of the invention include the use of a bulldozer without need for intervention of an operator, particularly providing an autonomous control of the bulldozer. That object also refers to controlling and navigating the bulldozer particularly by use of aboveground terrain information.

Some embodiments of the invention relates to a method for generating scaled terrain information while operating a bulldozer, the bulldozer comprising
  a driving unit comprising
    a set of drive wheels, particularly being part of a continuous track, and
    a motor connected to at least one of the drive wheels for providing movability of the bulldozer,
  a blade for altering the surface of the terrain,
  at least one camera for capturing images of the environment, particularly of the terrain, the camera being positioned and aligned in a known manner relative to the bulldozer, and
  a controlling and processing unit,
  In some embodiments the method may comprise:
  moving the bulldozer in the terrain whilst concurrently generating a set of image data by capturing an image series of terrain sections with the at least one camera so that at least two images, particularly successive images, of the image series cover an amount of identical points in the terrain, wherein the terrain sections are defined by a viewing field of the at least one camera at respective positions of the camera while moving,
  and either applying
    simultaneous localisation and mapping (SLAM) algorithm or
    a stereo photogrammetry algorithm
  to the set of image data and thereby deriving terrain data, the terrain data comprising
    a point cloud representing the captured terrain and
    position data relating to a relative position of the bulldozer in the terrain, and
    scaling the point cloud by applying an absolute scale information to the terrain data, particularly scaling the position data.

In some embodiments, the position data relates to the actual (relative) position of the bulldozer in the terrain. Each of the captured terrain sections is related to a respective position of the bulldozer as a pose of the camera for capturing that respective image is known and relative positions of the bulldozer are derivable from the image series. In other words, the terrain data may comprise position information regarding the position of the bulldozer and positions of the captured terrain sections.

Scaling of the position data particularly is to be understood as defining a respective position in a coordinate system, i.e. deriving true coordinates (x, y and z) according to the position.

Moreover the position data particularly relate to the orientation of the bulldozer in the terrain and thus may provide 6DoF (six degrees of freedom) information referring to the bulldozer.

Simultaneous localisation and mapping (SLAM) is a process of concurrently building a map of an environment (terrain), particularly based on stationary features or landmarks within the environment, and using this map to obtain estimates of the location of a vehicle (bulldozer). The vehicle relies on its ability to extract useful navigation information from data returned by the camera mounted on the bulldozer.

The method of gathering terrain information starts with unknown location of the bulldozer and without a priori knowledge e.g. of its location in the terrain or of a landmark locations.

In some embodiments, a vision based system may be used for providing data to the SLAM algorithm to form a navigation system for the bulldozer. This technique, also known as visual SLAM (VSLAM), uses the passive sensing by the camera to provide a low power and dynamic localisation system. Image processing is used to locate features in the images acquired by the camera, particularly identical points of the terrain in different (successive) images.

The features are input to the SLAM algorithm which is then able to accurately compute the three-dimensional location of each feature and hence particularly to start building a three-dimensional map as the bulldozer moves around the terrain. The system can build a map of its environment while simultaneously using that map to localise itself.

The camera of the bulldozer may be implemented as a panoramic camera, i.e. a camera providing a field of view up to 360° around at least one axis. Such camera particularly provides a comparatively large field of view by specific optics as by a specifically designed lens and/or comprises a kind of mirror for splitting and/or enlarging the initial field of view of the camera. Particularly the panoramic camera comprises a parabolic or cone like mirror for providing the field of view of up to 360°.

According to a specific embodiment of the invention, the absolute scale information is derived by receiving movement data from a sensor unit of the bulldozer providing information about a distance covered by moving the bulldozer, the sensor unit being designed as
- a sensor for detecting revolutions of at least one of the wheels of the bulldozer, and/or
- a distance measuring unit, particularly DISTO-module, for measuring distances to an object by emitting laser light and receiving the laser light reflected at the object, and/or
- a range camera, particularly RIM camera, and/or
- an inertial measuring unit (IMU), and/or
- a receiving unit for
  - global navigation satellite system (GNSS) signals and/or
  - differential global navigation satellite system (DGNSS) signals.

According to a further specific embodiment of the invention, the absolute scale information is derived by capturing a reference image of a reference body of known appearance and/or position in the terrain and deriving the absolute scale information by image processing based on the appearance of the reference body in the captured reference image and particularly of a known magnification ratio of the camera, wherein the dimensions, spatial orientation and/or shape of the reference body is pre-known.

From relative observations of landmarks (reference objects), according to the inventive method, simultaneous computation of an estimate of vehicle location and an estimate of landmark locations are provided. While continuing in motion, the vehicle builds a complete map of landmarks and uses these to provide continuous estimates of the vehicle location. By tracking the relative position between the vehicle and identifiable features (objects) in the environment, both the position of the vehicle and the position of the features can be estimated simultaneously. In the absence of external information about the position of the bulldozer, this algorithm presents an autonomous system with the tools necessary to navigate in unknown environments.

Concerning the handling of data produced by the bulldozer, according to the invention, the set of image data and/or the terrain data is transmitted to a database in which it is stored, wherein
- the bulldozer comprises a storing unit comprising the database, and/or
- a remote controlling unit for controlling the bulldozer comprises the storing unit comprising the database, and/or
- the database is embodied by a data cloud, particularly stored on a remote server, wherein
  - the terrain data is derived from the image data by cloud computing based on the simultaneous localisation and mapping (SLAM) algorithm or the stereo photogrammetry algorithm, and/or
  - the scaling of the point cloud is performed by cloud computing.

According to a further embodiment of the invention,
- the image data and/or the terrain data are transmitted to other working machines located in the terrain and/or
- the image data and/or the terrain data from other working machines located in the terrain are received via a network provided by the working machines, particularly a distributed network, wherein each working machine comprises means
- to process the image data and/or terrain data for updating the current terrain state and/or
- to transmit the image data and/or terrain data to a database and/or
- to transmit and/or to reference position data relating to a relative position of the other working machines in the terrain.

Instead of each working machine on the construction site sending its gathered terrain data to a certain central data base, the working machines are interconnected in a peer-to-peer network, though at least one data base can be part of it which is not built into a machine or vehicle. This networking arrangement has the main advantage that all working machines connected to the network—including the at least one data base—get real-time updates of the terrain information gathered by each individual working machine. Unlike in a centralised network, in such a distributed network the minimum amount of peers to be connected with, for keeping all peers updated, is one. This can keep the at least one data base up to date, even if not all working machines are directly connected to it. The network, however, is not restricted to the described network type.

According to a further specific embodiment of the invention, at least one state parameter is extracted from the set of image data and/or from the terrain data which represents an actual state of at least one designated terrain section. The at least one state parameter then is compared to a predetermined threshold for the respective state and constructional information are derived based on the comparison of the predetermined threshold and the state parameter.

In some embodiments, the state parameter particularly provides at least one terrain factor of a group of terrain factors, the group of terrain factors comprising at least the following factors:
- granularity of the terrain,
- substance of the terrain,
- brightness or colour of the terrain,
- humidity of the terrain,
- planarity of the terrain,
- volume of the terrain, and
- height of the terrain.

According to a more specific embodiment regarding the constructional information, the constructional information is provided to a user of the bulldozer, particularly together with a related recommendation concerning a suggested bulldozing of the respective at least one designated terrain section.

According to a further embodiment of the invention, the bulldozer and/or the blade of the bulldozer is moved, particularly automatically moved, based on the terrain data, in particular based on the point cloud, wherein
- the terrain data represents at least an actual shape of the captured terrain,
- constructional data is provided representing a target shape for the terrain and
- the blade is guided based on the constructional data so that the actual shape of the terrain is transferred into the target shape.

In particular, the bulldozer is positioned at a designated position in the terrain based on the terrain data and/or the blade is guided according to a designated shape of a terrain based on the terrain data and the constructional data.

This functionality provides an autonomous drive of the bulldozer and/or an automatic motion of the blade of the bulldozer. Particularly, the constructional data is provided as digital data (e.g. CAD-data) representing at least one designated shape of the ground. Preferably, the constructional data is derived from a designated digital terrain model on the one hand and a continuously created and updated digital terrain 3D-model (digital terrain map with altitude information) on the other hand.

A digital terrain map, particularly a digital terrain 3D-model, is created based on the point cloud, particularly based on the terrain data, and particularly based on the terrain data
- gathered by other working machines and
- obtained via the network.

Above aspect of the invention consequently also provides controlling of other working machines in the terrain based on the derived constructional information gathered by the at least one camera of the bulldozer.

The bulldozer according to the invention furthermore may provide determination of its actual position. For that, the position of the bulldozer is determined on basis of at least one captured locating image by comparing derived locating image data of the at least one captured locating image to pre-known image data.

Particularly, the position of the bulldozer is determined wherein a set of defined characteristics, particularly a set of individual values defining respective magnitudes of the characteristics, is derived from the locating image data and is compared to sets of reference characteristics, particularly to related reference values of the characteristics, the sets of reference characteristics being related to the pre-known image data, and the position of the bulldozer in the terrain is derived by that comparison due to each set of reference characteristics being associated to defined positions in the terrain.

According to another embodiment of the invention, those objects are to be recognized, which are to be excluded or subtracted from in the digital terrain map, particularly moving objects, particularly parts of the bulldozer.

For example while the bulldozer is moved autonomously, objects constituting an obstacle in the path of the bulldozer, particularly in the proposed path of the bulldozer, are recognized, whereby a collision of the bulldozer with a recognized object is automatically avoided.

Recognition can also be applied to objects to be excluded or subtracted from the digital terrain map, particularly moving objects, particularly parts of the bulldozer itself.

Recognizing terrain sections, particularly the current state of the terrain sections, which remain to receive a treatment to be provided by at least one other working machine, can cause sending out a signal via the network to the at least one other working machine, particularly directing the at least one other working machine to fulfill the corresponding treatment in the respective terrain section.

The invention also relates to a control system for use with a bulldozer, the bulldozer comprising at least a driving unit comprising a set of drive wheels, particularly being part of a continuous track, and a motor connected to at least one of the drive wheels for providing movability of the bulldozer and a blade for altering the surface of the terrain, and the control system comprising at least one camera for capturing images of a terrain, the camera to be positioned and aligned in a known manner relative to the bulldozer, and a controlling and processing unit for controlling the bulldozer.

Furthermore, the control system for the bulldozer provides a functionality adapted to generate scaled terrain information by executing, respectively controlling, following steps:
- concurrently generating a set of image data by capturing an image series of terrain sections with the camera whilst moving the bulldozer in the terrain so that at least two images, particularly successive images, of the image series cover an amount of identical points in the terrain, wherein the terrain sections are defined by a viewing area of the camera at respective positions of the camera while moving,
- either applying
  - a simultaneous localisation and mapping (SLAM) algorithm or
  - a stereo photogrammetry algorithm to the set of image data and thereby deriving terrain data, the terrain data comprising
- a point cloud representing the captured terrain and
- position data relating to a relative position of the bulldozer in the terrain, and
- scaling the point cloud by applying an absolute scale information to the terrain data, particularly scaling the position data.

Particularly, the control system for the bulldozer is designed so that a method as outlined above is executable by the bulldozer with means of the control system, wherein the execution of the method is provided by controlling and processing units.

In particular, the control system comprises:
- a counting sensor counting the number of revolutions of a wheel of the bulldozer, particularly of the at least one drive wheel, the counting sensor providing the absolute scale information and/or
- a distance measuring unit, particularly DISTO-module, for measuring distances to an object by emitting laser light and receiving the laser light reflected at the object and/or
- a range camera, particularly RIM camera, and/or
- swivelling means for swivelling the camera so that the camera is alignable in a designated direction for capturing the terrain sections or a reference body which provides the absolute scale information and/or
- at least one tilt sensor, particularly a gyroscope, and/or
- a compass, and/or
- at least one profiler, and/or
- at least one scanner, and/or at least one inertial sensor to be positioned on the blade, and/or a receiving unit for
global navigation satellite system (GNSS) signals, and/or
differential global navigation satellite system (DGNSS) signals.

Furthermore, the control system particularly comprises a display for showing the operator of the bulldozer recommendations for altering the terrain, and/or controlling means for controlling the path of the bulldozer, and/or the position of the blade.

Moreover the invention relates to a computer programme product having computer-executable instructions for controlling and executing an above method, in particular when run on a control system according to the above description.

BRIEF DESCRIPTION OF THE FIGURES

The method and the device according to the invention are described or explained in more detail below, purely by way of example, with reference to working examples shown schematically in the drawings. Specifically.

DETAILED DESCRIPTION

Figure 1A:
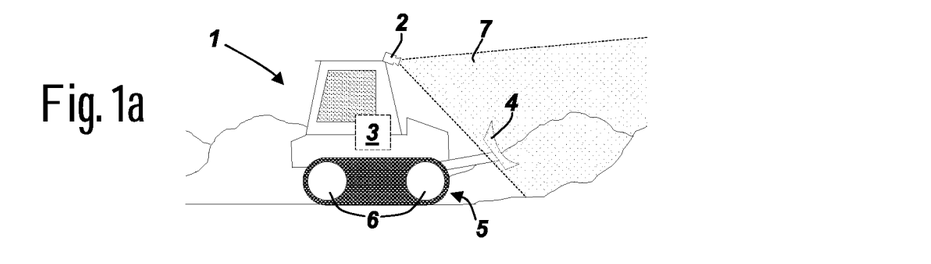
FIG. 1a shows a bulldozer according to the invention comprising a camera and a control unit.

FIG. 1a shows a bulldozer 1 with a control system comprising a camera 2 and a control unit 3. The bulldozer further comprises a blade 4 and a continuous track 5 with wheels 6. The camera 2 has a field of view 7 and is attached to the front of the bulldozer 1 for capturing images of the terrain (environment) while the bulldozer is moving in the terrain (generating a set of image data). The camera 2 is essentially directed towards the front of the bulldozer 1. The camera 2 provides to capture a series of images of the terrain, wherein the rate for capturing the images (frames per second) is chosen so that two (successive) images cover an amount of identical points in the terrain, i.e. the frame rate particularly is adjustable depending on the velocity of the bulldozer 1.

As the position (and orientation) of the bulldozer 1 is continuously changing while bulldozing or driving to the next job, and the position (and orientation) of the camera 2 is changing as well, each captured image covers a different terrain section. The captured terrain section thus is defined by the respective pose and the viewing area of the camera 7.

SLAM (simultaneous localisation and mapping) is performed based on the series of (successive) images by execution of a respective algorithm on the control and processing unit 3. The processing unit 3 may be integrated with the control unit 3 of the bulldozer 1 or may be embodied as a remote unit (not shown) receiving data (via wireless communication) from the bulldozer and providing processed data or control signals to the bulldozer 1, e.g. the control and processing unit 3 being integrated to a remote or field controller (not shown) of the bulldozer 1. Terrain data is produced by applying the SLAM algorithm. A central data base 8 (not shown) for example can comprise such remote unit, remote controller or field controller.

In the context of executing the SLAM-algorithm, the spatial representation of the surface of the terrain (terrain data) in form of a point cloud is computed from the set of image data (captured images), e.g. a 3D model. Alternatively and—as the principle of mapping and localisation corresponds to SLAM principle—also lying in the scope of the present invention, this calculation may be done by a defined Structure-from-Motion (SfM) algorithm, wherein that algorithm may be part of a stored program with code. The SLAM- or SfM-algorithm can be based on a perspective or affine camera projection model with observation sources which comprises image pairs, image tuples and/or a video sequence and token types such as sparse feature correspondence, dense optical flow field, lines or curves, or direct SfM-techniques that do not extract any tokens from the images.

In context with the present invention, SLAM and SfM are to be considered as equivalent methods for generating terrain information.

As an example, the following algorithm is described, which compromises a step where a number of image correspondences (identical points in the terrain) are found for at least some of the images of the set of image data. This is done using feature detection and matching algorithms such as SIFT, SURF, BRISK, BRIEF, etc. Alternatively, in case of a video sequence, the correspondences can be found using a tracking algorithm on each video frame. Tracking can be done using e.g. Kanade-Lucas-Tomasi (KLT) feature tracker or another tracking algorithm.

Using a pair of successive images the relative camera pose, i.e. position and orientation, is determined in a local coordinate frame. The algorithm uses a robust search to find a 3D translation and rotation of the camera 2 of the pair of images, e.g. the relative position and orientation of the second image with respect to the first image. With these positions the 3D position of all features seen in both images is computed using forward intersection. This gives a set of 3D points and the positions and orientations of the two initial images (frames).

In the next step, additional images (frames) are added to the existing reconstruction. Using already reconstructed 3D points, the position and orientation, which the camera 2 had during capture of an image, can be computed using resectioning. After adding a new image, the positions of 3D points are refined using all measurements in the reconstructed frames.

Particularly, as a final or intermediate step, the overall solution is refined using bundle adjustment. This part of the algorithm is a non-linear least squares minimization of the re-projection error. It will optimise the location and orientation of all camera positions and all 3D points.

If the recording contains multiple images from the same location, e.g. when the bulldozer stops moving, these images from the same location are matched. This will increase the overall accuracy.

Alternatively, other SLAM algorithms can be used to recover the positions and orientations of the camera 2. To further speed up the process, images can be transferred to a control and evaluation unit 3 during the recording of the data.

In a further development of the method, a further improvement of the spatial representation of the surface of the terrain can be achieved by computing a dense point cloud, e.g. a 3D-coordinate for each image pixel, with an algorithm such as dense matching algorithm, e.g. depth map fusion or plane sweeping.

In a next step, the point cloud and particularly the position data for the bulldozer, particularly for each of the captured terrain sections (spatial representation of the terrain), is scaled with help of information about a known absolute reference, e.g. a tower, a building, a power pole or a bridge. Advantageously, both a vertical and a horizontal orientation of the terrain data are determined using a known reference body.

According to a specific embodiment of the invention, such scaling of the terrain data is enabled by capturing and processing of an image of a reference body of known shape and/or structure, particularly an elongated reference body, that defines e.g. a long axis due to its elongated shape and comprises at least two defined visually detectable markings, whereby at least two points are defined on the reference body. The reference body may be designed as for example a scale bar or a bar with two or more optical markers in a defined distance to each other.

An absolute distance between the at least two points, particularly also the spatial relationship of the at least two points with respect to the long axis of the body, are known. This reference body is placed on or next to the terrain to be bulldozed. The reference body is imaged with help of the camera 2 on at least some images together with or additionally to the captured terrain images. At least two spatial positions relative to the terrain are determined for the at least two points for instance also based on the SLAM-evaluation. Then, the point cloud is scaled based on a measured distance in between the determined at least two spatial positions and the known absolute distance between the at least two points of the reference body.

Such a reference body can also be formed by defined points or objects in the terrain with known distance, detectable in an image. This known distance can be derived by a measurement with a measurement device such as a distance meter (electronic distance meter, EDM), which can be integrated in the bulldozer e.g. in form of a DISTO module. Such a visually detectable point can be defined by an edge or a spot with a different property compared to the surrounding. A visually detectable point can further comprise an optical marking such as a colour spot or a geometric shape like a circle. As an example, a reference body can thus be formed by an object of known dimensions, such as the height or width of the object or of a part of it.

According to another specific embodiment of the invention, the absolute scale information is derived by measuring the propagation of the bulldozer 1 while generating the set of image data, that is, while moving.

For that purpose, the bulldozer 1 comprises a measuring unit for detecting the rotation or state of rotation of at least one of the wheels 6 of the bulldozer 1, in particular of the continuous track 5. Such a unit may be embodied as a counting sensor which counts the number of rotations of one of the wheels 6 or the continuous track 5, or may be built as an angle detection unit for continuously determining an angular position of one of the wheels 6 relative to the bulldozer 1.

Such a unit may specifically be designed as angle encoder. Also detected and regarded for the determination of the driven distance are—in case the bulldozer comprises a continuous track 5—the relative movement between a right and a left continuous track, by which means the bulldozer is capable to be steered, as well as—in case the bulldozer only comprises single wheels—the alignment of an at least one steering axle.

Moreover, the dimensions of the respective wheels 6 are known (e.g. diameter, radius or perimeter) and thus a moving distance of the bulldozer 1 is enabled to be derived based on the detection of the wheel rotation and the dimensions of the wheels 6. In other words, an absolute measure of a positional change of the bulldozer 1 in the terrain is provided.

The images captured by the camera or respective terrain sections are associated to the correspondingly measured moving distances. By that, the terrain data (point cloud), which is based on the captured images, is scaleable by comparing measured distances to the derived point cloud and/or to the position data relating to positions of the bulldozer 1. In a further step, a scaled map of the terrain is processable.

Therefore, according to each of the alternatives for providing the absolute scale, an efficient method for gathering scaled terrain information and simultaneously generating a map of the terrain is given. Thus, the bulldozer 1 can be places in unknown terrain, wherein by execution of the SLAM based on images, which are captured while moving the bulldozer 1 in the terrain, a navigation of the bulldozer 1 is enabled.

Figure 1B:
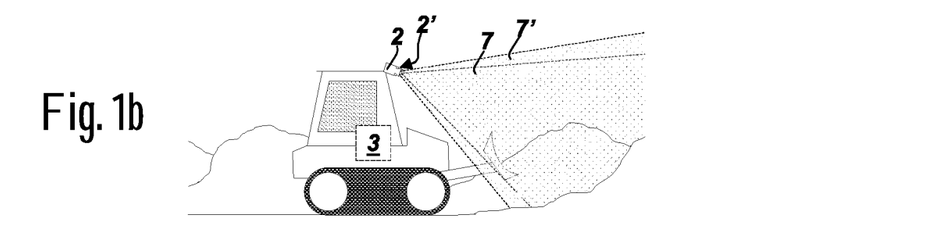
FIG. 1b shows a further bulldozer according to the invention comprising two aligned cameras and a control unit.

The control system of the dozer 1 in FIG. 1b is equipped with two cameras 2, 2' and a control unit 3. The camera 2 has a field of view 7 and the camera 2' has a field of view 7'. The fields of view 7 and 7' are overlapping so that the cameras share a terrain segment they both capture. Both cameras are attached to the front of the bulldozer 1 for capturing images of the terrain (environment) while the bulldozer is moving in the terrain (generating a set of image data). The cameras 2,2' are essentially directed towards the front of the bulldozer 1. The cameras 2,2' provide to capture a series of images of the terrain, wherein the rate for capturing the images (frames per second) particularly is adjustable depending on the velocity of the bulldozer 1.

With the alignments of the cameras 2, 2' relative to each other and the positions of the cameras 2, 2' relative to the bulldozer 1 being known (photogrammetric base), and with means of common principles of stereo photogrammetry a distance to a target can be measured, whereby characteristic elements of the captured pictures are being used as basis for the calculation.

Figure 1C:
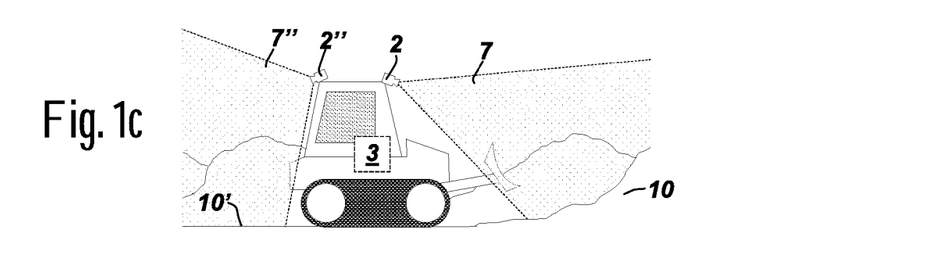
FIG. 1c shows a further bulldozer according to the invention comprising two opposing cameras and a control unit.

FIG. 1c shows a bulldozer having two cameras 2, 2" aligned against each other, i.e. one to the front and one to the back of the bulldozer. With field of view 7 camera 2 has a view of the terrain section to be bulldozed 10 and with field of view 7" camera 2" has a view of the terrain section already bulldozed 10'. Together with information about the distance travelled by the bulldozer, control unit 3 can calculate the earth volume that has been moved and/or check if the bulldozing step has been fulfilled within the scope of a given construction tolerance. The second camera 2" can also be used to give an immediate update to the map or 3D model that is built up by the control system of the bulldozer and optionally with help of other working machines allocated in the terrain. This functionality is particularly applicable when bulldozer 1 is actually bulldozing in the forward direction.

Figure 1D:
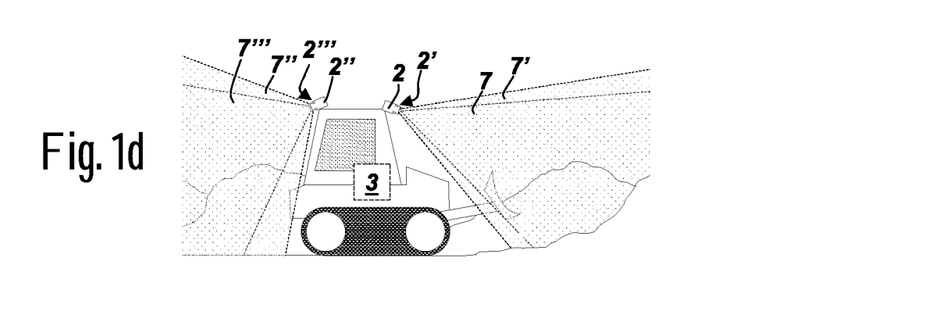
FIG. 1d shows a further bulldozer according to the invention comprising four cameras and a control unit.
Figure 2A:
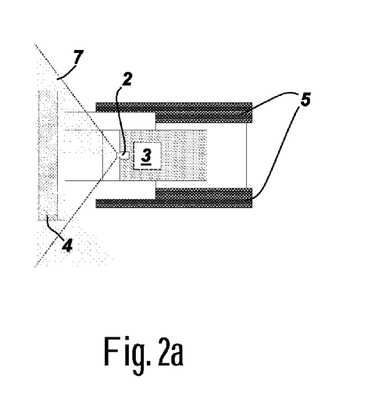
FIG. 2a shows the bulldozer according to FIG. 1a from an aerial perspective.
Figure 2B:
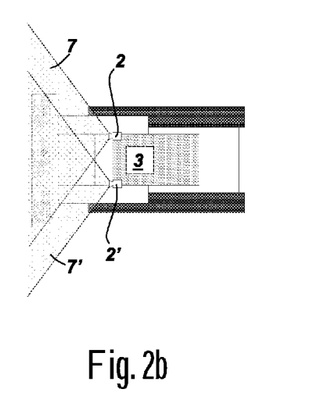
FIG. 2b shows the bulldozer according to FIG. 1b from an aerial perspective.
Figure 2C:
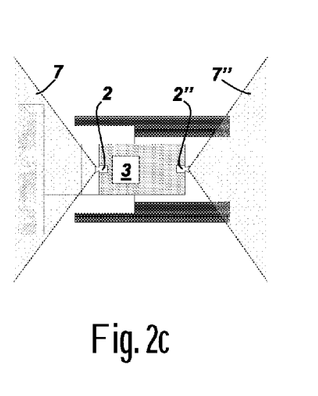
FIG. 2c shows the bulldozer according to FIG. 1c from an aerial perspective.
Figure 2D:
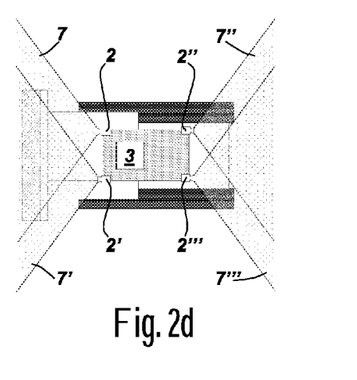
FIG. 2d shows the bulldozer according to FIG. 1d from an aerial perspective.

FIG. 1*d* shows a fourth embodiment of the invention and that is a bulldozer with four cameras 2,2',2",2'". According to FIG. 1*b*, cameras 2 and 2' on the one hand as well as cameras 2" and 2'" on the other hand share part of their fields of view. Hence, visual range 7 and 7' are overlapping and directing to the front of the bulldozer, and visual range 7" and 7'" are overlapping and directed to the back of the bulldozer. With this assembly control unit 3 provides functionalities according to the description of FIG. 1*b* and 1*c*.

This monitoring concept is extendable to any other direction around the bulldozer, where in the border case it will end up in a 360° panoramic monitoring system that can be used by the control system.

FIGS. 2*a*, 2*b*, 2*c* and 2*d* show the embodiments of FIGS. 1*a*, 1*b*, 1*c* and 1*d* accordingly from an aerial perspective.

Moving or non-moving objects, which are not part of the map or 3D model to be created, like e.g. blade 4 of the actual bulldozer, a co-worker running past in front of the bulldozer or other moving working machines, are inevitably captured by the viewing range of the cameras. These objects can be subtracted out of the image data captured by the cameras or the point cloud with help of either an object recognition functionality or a direct communication process through the network (between the moving working machines).

Correspondingly, the control system according to the invention can be used for obstacle avoidance purposes. Detected and/or recognised objects potentially blocking the way of the bulldozer and causing a collision may prompt the bulldozer to produce an alarm signal and/or stop moving if necessary.

Figure 3:
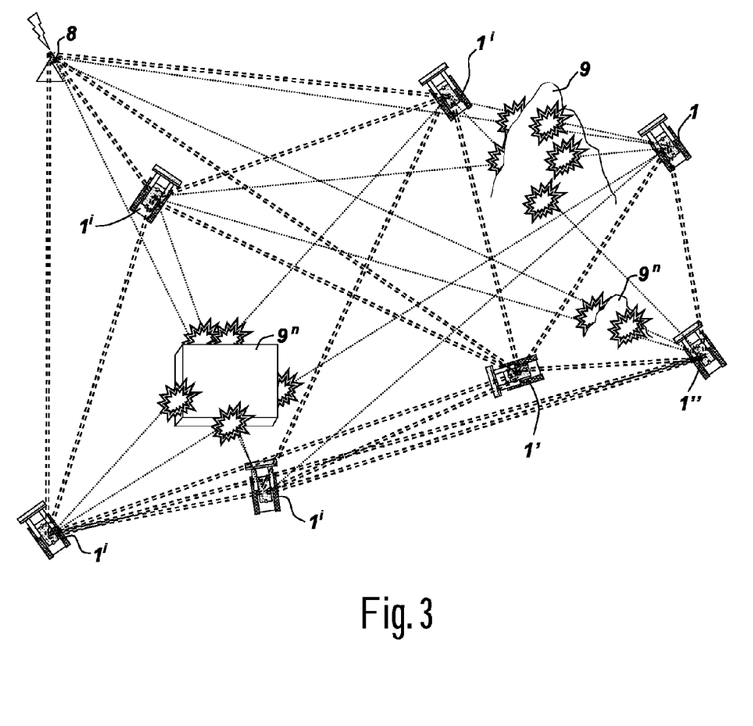
FIG. 3 shows a working site from an aerial perspective, comprising a central station having an overall data base, and working machines, particularly bulldozers, the central station and the working machines setting up a distributed network to exchange image data and/or terrain data.

FIG. 3 shows a construction site (terrain) from an aerial perspective. A central office 8 comprising an overall data base (central data base) can be part of the distributed network generated by several working machines 1,1',1",1$^i$, which particularly are bulldozers according to the invention. The network is indicated through the double dashed lines.

Preferentially, each network peer maintains a bilateral connection with every other network peers. Because of obstacles 9,9" some working machines cannot set up a connection to other members of the network. These disturbed or interrupted connections are indicated through thin single-dashed lines and a prohibition sign at the respective disturbance spot. Besides mounds of earth, other possible obstacles can be buildings or woodland. Through the fact that information (image data or terrain data) is shared with all network members in range, this network type is robust against obstacles and keeps every network member updated about the information being shared even if not in direct connection with the central station 8. As an example, because of hill 9, bulldozer 1 does not have a direct, but has an indirect connection with data base 8 via bulldozers 1', 1" and 1$^i$.

The central office station 8 can undertake overall management of the work site with the information received via the distributed network and subsequently saved in its overall data base. However, every network member, i.e. every bulldozer comprising the control system according to the invention or other working machines providing respective information, may comprise such overall data base as well as a processing unit necessary for processing the received data.

Other working machines can also be earth moving machines which are not bulldozers, such as diggers, dumpers, rollers or loaders.

According to another aspect of the invention, the control system recognizes and assigns earth moving jobs by comparing the actual state of the terrain with the designated shape of the terrain. If, for example, after a terrain section was bulldozed, a next constructional step would be to dig a hole, an according working machine (digger) more suitable to this job can be requested by the control system via a network.

What is claimed is:

1. A method for generating scaled terrain information while operating a bulldozer, the bulldozer comprising
   a driving unit comprising:
      a set of drive wheels being part of a continuous track, and
      a motor connected to at least one of the drive wheels for providing movability of the bulldozer,
   a blade for altering the surface of the terrain,
   at least one camera for capturing images of the environment, the camera being positioned and aligned in a known manner relative to the bulldozer, and
   a controlling and processing unit,
   wherein the method comprises:
   moving the bulldozer in the terrain whilst concurrently generating a set of image data by capturing an image series of terrain sections with the at least one camera so that at least two successive images of the image series cover an amount of identical points in the terrain, wherein the terrain sections are defined by a viewing field of the at least one camera at respective positions of the camera while moving,
   and either applying
   a simultaneous localisation and mapping (SLAM) algorithm or
   a stereo photogrammetry algorithm
   to the set of image data and thereby deriving terrain data, the terrain data comprising
   a point cloud representing the captured terrain and
   position data relating to a relative position of the bulldozer in the terrain, and
   scaling the point cloud by applying an absolute scale information to the terrain data.

2. The method according to claim 1, wherein:
   the absolute scale information is derived by receiving movement data from a sensor unit of the bulldozer providing information about a distance covered by moving the bulldozer, the sensor unit being designed as
      a sensor for detecting revolutions of at least one of the wheels of the bulldozer, and/or
      a distance measuring unit for measuring distances to an object by emitting laser light and receiving the laser light reflected at the object, and/or
      a range camera, and/or
      an inertial measuring unit (IMU), and/or
      a receiving unit for global navigation satellite system (GNSS) signals and/or
      differential global navigation satellite system (DGNSS) signals.

3. The method according to claim 1, wherein:
   the absolute scale information is derived by capturing a reference image of a reference body of known appearance and/or position in the terrain and deriving the absolute scale information by image processing based on the appearance of the reference body in the captured reference image and of a known magnification ratio of the camera, wherein the dimensions, spatial orientation and/or shape of the reference body is pre-known.

4. The method according to claim 1, wherein:
transmitting the set of image data and/or the terrain data to a database and storing the data in it, wherein
the bulldozer comprises a storing unit comprising the database, and/or
a remote controlling unit for controlling the bulldozer comprises the storing unit comprising the database, and/or
the database is embodied by a data cloud stored on a remote server, wherein
the terrain data is derived from the image data by cloud computing based on the simultaneous localisation and mapping (SLAM) algorithm or the stereo photogrammetry algorithm, and/or
the scaling of the point cloud is performed by cloud computing.

5. The method according to claim 1, wherein:
transmitting the image data and/or the terrain data to other working machines located in the terrain and/or
receiving image data and/or the terrain data from other working machines located in the terrain
via a network provided by the working machines, wherein each working machine is configured to:
to process the image data and/or terrain data for updating the current terrain state, and/or
to transmit the image data and/or terrain data to a database, and/or
to transmit and/or to reference position data relating to a relative position of the other working machines in the terrain.

6. The method according to claim 1, wherein:
extracting at least one state parameter from the set of image data and/or from the terrain data which represents an actual state of at least one designated terrain section,
comparing the state parameter to a predetermined threshold for the respective state, and
deriving constructional information based on the comparison of the predetermined threshold and the state parameter,
wherein the state parameter provides at least one terrain factor of a group of terrain factors, the group of terrain factors comprising at least one or more of the factors selected from the list consisting of:
granularity of the terrain,
substance of the terrain,
brightness or colour of the terrain,
humidity of the terrain,
planarity of the terrain,
volume of the terrain, and
height of the terrain.

7. The method according to claim 6, wherein:
the constructional information is provided to a user of the bulldozer, together with a related recommendation concerning a suggested bulldozing of the respective at least one designated terrain section.

8. The method according to claim 1, wherein:
moving the bulldozer and/or blade, based on the terrain data, wherein
the terrain data represents at least an actual shape of the captured terrain,
constructional data is provided representing a target shape for the terrain and
the blade is guided based on the constructional data so that the actual shape of the terrain is transferred into the target shape,
wherein the bulldozer is positioned at a designated position in the terrain based on the terrain data and the blade is guided according to a designated shape of a terrain based on the terrain data and the constructional data.

9. The method according to claim 1, wherein:
creating a digital terrain map is based on the point cloud.

10. The method according to claim 1, wherein:
creating a digital terrain map includes creating a digital terrain 3D-model.

11. The method according to claim 1, wherein:
creating a digital terrain map is based on the terrain data gathered by other working machines and obtained via the network.

12. The method according to claim 1, wherein recognizing objects constituting an obstacle in the proposed path of the bulldozer, wherein a collision of the bulldozer with a recognized object is automatically avoided.

13. The method according to claim 1, wherein recognizing objects to be excluded or subtracted from the digital terrain map.

14. The method according to claim 1, wherein recognizing the current state of the terrain sections, which remain to receive a treatment to be provided by at least one other working machine, and sending out a signal via the network to the at least one other working machine, directing the at least one other working machine to fulfill the corresponding treatment in the respective terrain section.

15. A control system for use with a bulldozer, the bulldozer comprising:
a driving unit comprising
a set of drive wheels, and
a motor connected to at least one of the drive wheels for providing movability of the bulldozer and
a blade for altering the surface of the terrain, and
the control system comprising at least
one camera for capturing images of a terrain, the camera to be positioned and aligned in a known manner relative to the bulldozer, and
a controlling and processing unit, wherein:
the control system provides a functionality adapted to generate scaled terrain information by executing, respectively controlling, following steps:
concurrently generating a set of image data by capturing an image series of terrain sections with the camera whilst moving the bulldozer in the terrain so that at least two images of the image series cover an amount of identical points in the terrain, wherein the terrain sections are defined by a viewing area of the camera at respective positions of the camera while moving,
either applying:
a simultaneous localisation and mapping (SLAM) algorithm or
a stereo photogrammetry algorithm
to the set of image data and thereby deriving terrain data, the terrain data comprising
a point cloud representing the captured terrain and
position data relating to a relative position of the bulldozer in the terrain, and
scaling the point cloud by applying an absolute scale information to the terrain data.

16. The control system according to claim 15, further comprising:

a counting sensor counting the number of revolutions of a wheel of the bulldozer, the counting sensor providing the absolute scale information; and/or a distance measuring unit for measuring distances to an object by emitting laser light and receiving the laser light reflected at the object; and/or a range camera; and/or swivelling means for swivelling the camera so that the camera is alignable in a designated direction for capturing the terrain sections or a reference body which provides the absolute scale information.

17. The control system according to claim 15, further comprising:
   at least one tilt sensor; and/or
   a compass; and/or
   at least one profiler; and/or
   at least one scanner; and/or
   at least one inertial sensor to be positioned on the blade.

18. The control system according to claim 15, further comprising a receiving unit for
   global navigation satellite system (GNSS) signals, and/or
   differential global navigation satellite system (DGNSS) signals.

19. The control system according to claim 15, further comprising:
   a display for showing the operator of the bulldozer recommendations for altering the terrain; and/or
   controlling means for controlling the path of the bulldozer; and/or
   the position of the blade.

20. One or more non-transitory computer-readable media storing one or more programs that are configured, when executed, to cause one or more processors to execute the method as recited in claim 1.

* * * * *